US011967918B2

(12) United States Patent
Wang et al.

(10) Patent No.: US 11,967,918 B2
(45) Date of Patent: Apr. 23, 2024

(54) METHOD AND DEVICE FOR CONTROLLING GENERATOR-SIDE TERMINAL VOLTAGE OF CONVERTER, AND CONTROLLER OF CONVERTER

(71) Applicant: XINJIANG GOLDWIND SCIENCE & TECHNOLOGY CO., LTD., Urumqi (CN)

(72) Inventors: Jinpeng Wang, Beijing (CN); Rui Guo, Beijing (CN); Liangnian Lv, Beijing (CN)

(73) Assignee: GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 31 days.

(21) Appl. No.: 17/782,754

(22) PCT Filed: May 26, 2020

(86) PCT No.: PCT/CN2020/092338
§ 371 (c)(1),
(2) Date: Jun. 6, 2022

(87) PCT Pub. No.: WO2021/109494
PCT Pub. Date: Jun. 10, 2021

(65) Prior Publication Data
US 2023/0006580 A1    Jan. 5, 2023

(30) Foreign Application Priority Data
Dec. 6, 2019   (CN) .......................... 201911241766.8

(51) Int. Cl.
*H02P 9/00*   (2006.01)
*H02P 9/14*   (2006.01)
(52) U.S. Cl.
CPC ..................................... *H02P 9/14* (2013.01)

(58) Field of Classification Search
CPC .......... H02P 9/14; H02P 2101/15; H02P 9/48; H02P 2103/20
See application file for complete search history.

(56) References Cited

U.S. PATENT DOCUMENTS 4,908,565 A * 3/1990 Cook ..................... H02P 9/48
322/40
5,798,631 A * 8/1998 Spee ..................... F03D 7/046
322/29

(Continued)

FOREIGN PATENT DOCUMENTS

| CN | 101534014 A | 9/2009 |
| CN | 102361324 A | 2/2012 |

(Continued)

OTHER PUBLICATIONS

Notification to Grant Patent Right in related Chinese Application No. 201911241766.8 dated Sep. 15, 2022 (7 pages).

(Continued)

*Primary Examiner* — Julio C. Gonzalez
(74) *Attorney, Agent, or Firm* — Bayes PLLC

(57) ABSTRACT

The present application provides a method and device for controlling a generator-side terminal voltage of a converter, and a controller of the converter. The method includes: determining an upper limit of the generator-side terminal voltage based on a present voltage value of a direct-current (DC) bus of the converter, where the generator-side terminal voltage is a voltage of an output terminal of a generator, and the output terminal is connected to the converter; determining an optimal value of the generator-side terminal voltage that minimizes a present value of a generator-side current, where the generator-side current is a current of the output terminal of the generator; setting a target value of the generator-side terminal voltage based on the upper limit and (Continued)

the optimal value of the generator-side terminal voltage. The target value includes a control reference value of the generator-side terminal voltage.

11 Claims, 3 Drawing Sheets

(56) References Cited

U.S. PATENT DOCUMENTS

| | | | | |
|---|---|---|---|---|
| 2009/0146500 A1* | 6/2009 | Jones | ..................... | H02J 3/381 290/44 |
| 2012/0056602 A1 | 3/2012 | Li et al. | | |

FOREIGN PATENT DOCUMENTS

| | | |
|---|---|---|
| CN | 103314522 A | 9/2013 |
| CN | 104821765 A | 8/2015 |
| CN | 105281621 A | 1/2016 |
| CN | 105305499 A | 2/2016 |
| CN | 107408894 A | 11/2017 |
| CN | 107607869 A | 1/2018 |
| CN | 107785926 A | 3/2018 |
| CN | 108063569 A | 5/2018 |
| CN | 108075701 A | 5/2018 |
| CN | 108696219 A | 10/2018 |
| CN | 109120206 A | 1/2019 |
| CN | 109672218 A | 4/2019 |
| CN | 109995045 A | 7/2019 |
| CN | 109995405 A | 7/2019 |
| EP | 2768134 A1 | 8/2014 |
| JP | 2000184798 A | 6/2000 |
| JP | 2004190620 A | 7/2004 |
| JP | 2009024657 A | 2/2009 |

OTHER PUBLICATIONS

First Office Action in related Chinese Application No. 201911241766.8 dated Jun. 20, 2022 (11 pages).
Extended European Search Report in related European Application No. 20896727.3 dated Dec. 16, 2022 (7 pages).
Office Action in related Indian Application No. 202217032206 dated Oct. 20, 2022 (5 pages).
Xibo Yuan et al: "De-link Voltage Control of Full Power Converter for Wind Generator Operating in Weak Grid Systems", Applied Power Electronics Conference and Exposition, 2008. APEC 2008. Twenty-Third Annual IEEE, IEEE, Piscataway, Feb. 24, 2008 (Feb. 24, 2008), 761-767, XP031253333, ISBN: 978-1-4244-1873-2.
Office Action in related Australian Application No. 2020397366 dated Feb. 2, 2023 (4 pages).
Yuan, X. et al., 'DC-link Voltage Control of a Full Power Converter for Wind Generator Operating in Weak-Grid Systems', IEEE Transactions on Power Electronics, vol. 24, No. 9, Sep. 2009, pp. 2178-2192.
International Search Report in corresponding PCT Application No. PCT/CN2020/092338, dated Sep. 8, 2020 (8 pages).
Office Action in related Canadian Application No. 3160913 dated Jul. 7, 2023 (3 pages).
Office Action in related Chilean Application No. 202201480 dated Feb. 1, 2024 (20 pages).

* cited by examiner

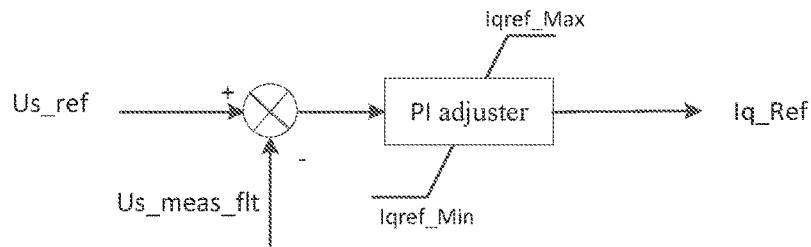

FIG. 1

```
determining an upper limit of the generator-side
terminal voltage based on a present voltage value      S10
of a DC bus of the converter
```

```
determining an optimal value of the generator-side
terminal voltage that minimizes a present value of a   S20
generator-side current
```

```
setting a target value of the generator-side terminal
voltage based on the upper limit of the generator-
side terminal voltage and the optimal value of the     S30
generator-side terminal voltage
```

FIG. 2

METHOD AND DEVICE FOR CONTROLLING GENERATOR-SIDE TERMINAL VOLTAGE OF CONVERTER, AND CONTROLLER OF CONVERTER

CROSS-REFERENCE TO RELATED APPLICATIONS

This application is the national phase of International Application No. PCT/CN2020/092338, filed on May 26, 2020, which claims the priority to Chinese Patent Application No. 201911241766.8, filed on Dec. 6, 2019. The entire contents of each of the above-identified applications are expressly incorporated herein by reference.

TECHNICAL FIELD

The present application generally relates to a technical field of converters, and in particular, to a method and device for controlling a generator-side terminal voltage of a converter, and a controller of the converter.

BACKGROUND

FIG. 1 illustrates a control method of a permanent-magnet direct-drive wind power converter to a terminal voltage of a generator. In FIG. 1, Us_ref is a control target value of a field weakening voltage, which is generally a constant value; Us_meas_flt is a feedback value of the field weakening voltage (which is generally an estimated value based on the actual operation); Iq_Ref is an reactive current reference value obtained by PI adjustment of a tracking deviation of the field weakening voltage; Iqref_Max and Iqref_Min are output limit values of a PI adjuster. Taking Iq_Ref as a reference input of a current inner loop, the converter tracks the reactive current reference value and outputs the reactive current, and the reactive current acts on the generator to adjust the field weakening voltage of the generator.

In the prior art, because that the control target value of the field weakening voltage is constant, there will be a problem of low utilization of a direct-current (DC) voltage in some working conditions, a problem of overmodulation in some working conditions, and a problem of low efficiency of the electric transmission chain.

SUMMARY

The exemplary embodiments of the present application provide a method and device for controlling a generator-side terminal voltage of a converter, and a controller of the converter.

According to an exemplary embodiment of the present application, a method for controlling a generator-side terminal voltage of a converter is provided. The method includes: determining an upper limit of the generator-side terminal voltage based on a present voltage value of a direct-current (DC) bus of the converter, wherein the generator-side terminal voltage is a voltage of an output terminal of a generator, and the output terminal of the generator is connected to the converter; determining an optimal value of the generator-side terminal voltage from a preset optimal search interval, wherein the optimal value minimizes a present value of a generator-side current when compared with other values in the preset optimal search interval, wherein the generator-side current is a current of the output terminal of the generator; setting a target value of the generator-side terminal voltage based on the upper limit of the generator-side terminal voltage and the optimal value of the generator-side terminal voltage. The target value is used to obtain a control reference value of the generator-side terminal voltage.

According to another exemplary embodiment of the present application, a device for controlling a generator-side terminal voltage of a converter is provided. The device includes: an upper limit determination unit configured to determine an upper limit of the generator-side terminal voltage based on a present voltage value of a direct-current (DC) bus of the converter, wherein the generator-side terminal voltage is a voltage of an output terminal of a generator, and the output terminal of the generator is connected to the converter; an optimal value determination unit configured to determine an optimal value of the generator-side terminal voltage from a preset optimal search interval, wherein the optimal value minimizes a present value of a generator-side current when compared with other values in the preset optimal search interval, wherein the generator-side current is a current of the output terminal of the generator; a setting unit configured to set a target value of the generator-side terminal voltage based on the upper limit of the generator-side terminal voltage and the optimal value of the generator-side terminal voltage. The target value is used to obtain a control reference value of the generator-side terminal voltage.

According to another exemplary embodiment of the present application, a controller of a converter is provided. The controller includes: a processor; a memory having computer programs stored thereon, wherein the computer programs, when executed by the processor, implement the method for controlling the generator-side terminal voltage of the converter described above.

According to another exemplary embodiment of the present application, a computer-readable storage medium having computer programs stored thereon is provided. The computer programs, when executed by a processor, implement the method for controlling the generator-side terminal voltage of the converter described above.

Additional aspects and/or advantages of the general concept of the present application will be set forth in part in the following description, and other parts will be apparent from the description, or may be learned by practice of the general concept of the present application.

BRIEF DESCRIPTION OF THE DRAWINGS

The above and other objects and features of the exemplary embodiments of the present application will become more apparent from the following description in conjunction with the accompanying drawings that exemplarily illustrate the embodiments, in which:

FIG. 1 illustrates an example of obtaining a reactive current reference by an existing converter;

FIG. 2 illustrates a flowchart of a method for controlling a generator-side terminal voltage of a converter according to an exemplary embodiment of the present application;

DETAILED DESCRIPTION

Figure 3:
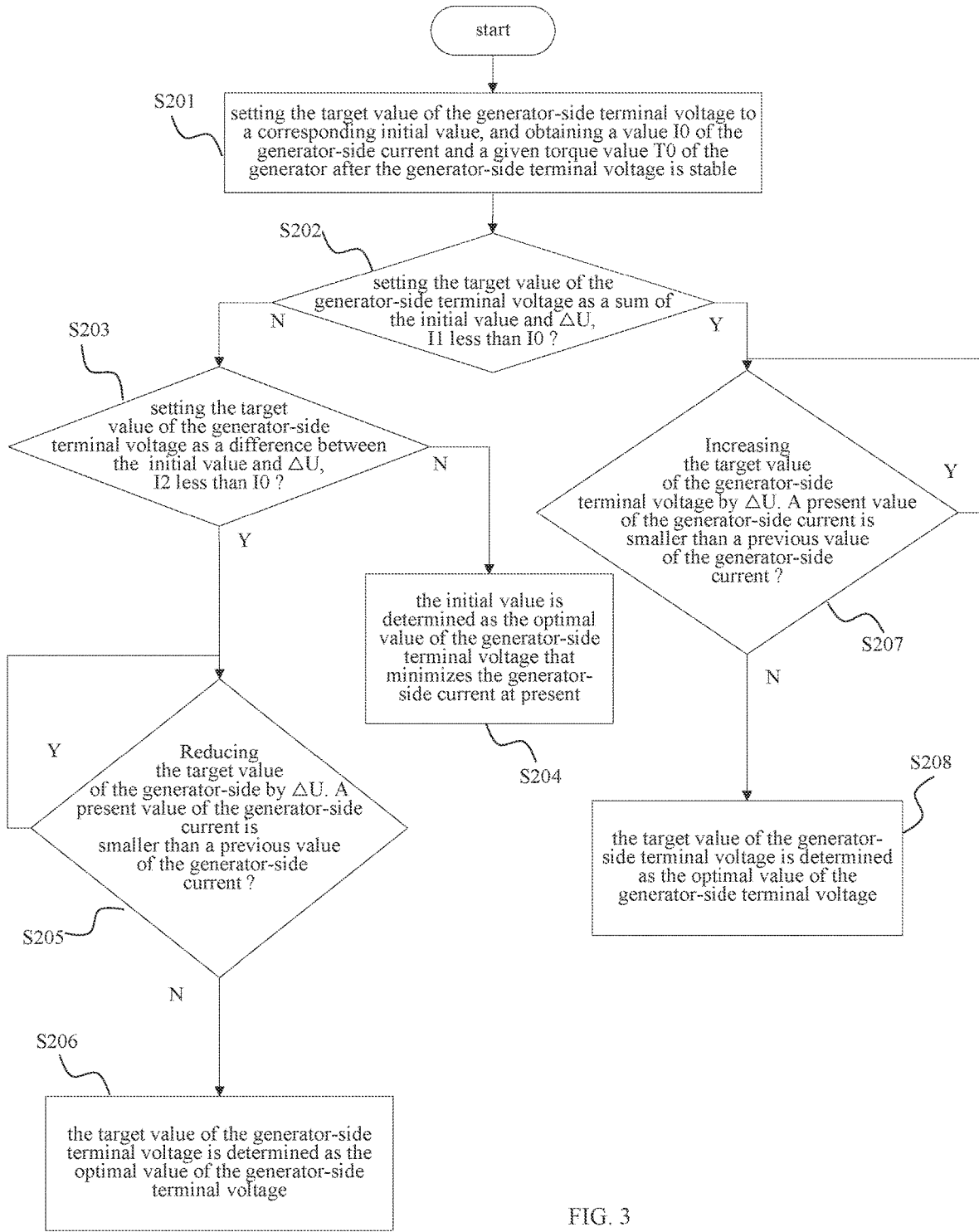
FIG. 3 illustrates a flowchart of a method for determining an optimal target value of a generator-side terminal voltage according to an exemplary embodiment of the present application.

Reference will now be made in detail to the embodiments of the present application, and the examples of the embodiments are illustrated in the accompanying drawings, wherein like reference numerals refer to like components. The embodiments will be described below by referring to the figures, so as to explain the present application.

The converter involved in the exemplary embodiments of the present application includes a generator-side rectifier unit and a grid-side inverter unit, and the output terminal of the generator is connected to the power grid via the generator-side rectifier unit and the grid-side inverter unit in sequence. For example, the converter may be a wind power converter, and accordingly, the generator may be a generator of a wind turbine set.

FIG. 2 illustrates a flowchart of a method for controlling a generator-side terminal voltage of a converter according to an exemplary embodiment of the present application.

Referring to FIG. 2, in step S10, an upper limit of the generator-side terminal voltage is determined based on a present voltage value of a DC bus of the converter. Therefore, the upper limit of the generator-side terminal voltage may be associated with the voltage of the DC bus in real time, and the upper limit of the generator-side terminal voltage can be dynamically changed with the change of the voltage of the DC bus.

Here, the generator-side terminal voltage is a terminal voltage of a generator whose output terminal is connected to the converter (i.e., the output terminal voltage of the generator). As an example, the generator-side terminal voltage may be a generator-side phase voltage or a generator-side line voltage.

Here, the target value of the generator-side terminal voltage is a control reference value of the generator-side terminal voltage, that is, a control target value of a field weakening voltage of the generator.

As an example, on the basis of the present voltage value of the DC bus of the converter, the upper limit of the generator-side terminal voltage may be determined further based on at least one of a preset maximum availability of a voltage of the DC bus, a voltage loss corresponding to a dead time of an Insulate-Gate Bipolar Transistor (IGBT) module in a generator-side rectifier unit of the converter, and an on-state voltage drop of the IGBT module in the generator-side rectifier unit of the converter.

As an example, under a condition that the generator-side terminal voltage is the generator-side line voltage, and considering that the commonly used modulation technology of the converter is a space vector modulation (SVPWM) method, the maximum availability of the DC voltage is 1.1547 when this modulation method is adopted. The maximum line voltage value that can be modulated theoretically is shown in equation (1):

$$U_{linevoltage\_max} = U_{dc}/\sqrt{2} \quad (1)$$

Here, $U_{linevoltage\_max}$ is the maximum value of the generator-side line voltage that can be modulated theoretically, and $U_{dc}$ is the voltage value of the DC bus.

It can be seen from equation (1) that for the terminal voltage of the generator, the voltage of the DC bus limits its upper limit value. Therefore, under a condition that the DC voltage changes greatly, the corresponding upper limit value of the terminal voltage of the generator also changes. That is, if the voltage of the DC bus is greatly increased, the maximum voltage that can be output by the converter will also increase (at this time, using a fixed target value of the terminal voltage of the generator may result in low utilization of the DC voltage). If the voltage of the DC bus is greatly reduced, the maximum voltage that can be output by the converter will also decrease (at this time, using a fixed target value of the terminal voltage of the generator may result in overmodulation). Therefore, using a fixed target value of the terminal voltage of the generator cannot adapt to the change of the DC voltage, which brings the above problems. Thus, the present application proposes to determine the upper limit of the generator-side terminal voltage based on the present voltage value of the DC bus of the converter.

As an example, considering the influence of the tube voltage drop of the generator-side rectifier unit and the dead zone on the utilization of the DC voltage, the upper limit of the generator-side terminal voltage may be calculated by equation (2) or equation (3):

$$U_{ref\_max\_limit} = \frac{U_{dc\_meas}}{\sqrt{2}} - U_{dead\_time} - VCE_{sat} \quad (2)$$

$$U_{ref\_max\_limit} = \frac{U_{dc\_meas}}{\sqrt{2}} - U_{lost} \quad (3)$$

$U_{ref\_max\_limit}$ is the upper limit of the generator-side terminal voltage, $U_{dc\_meas}$ is the real-time voltage value of the DC bus of the converter, $U_{dead\_time}$ is the voltage loss corresponding to the dead time of the IGBT module in the generator-side rectifier unit (which can be calculated according to the dead time), $VCE_{sat}$ is the on-state voltage drop of the IGBT module (which can be obtained from the datasheet of the IGBT), $U_{lost}$ is the comprehensive voltage drop obtained based on the equivalent voltage drop in the dead zone of the IGBT and the tube voltage of the IGBT.

In addition, as another example, under a condition that the generator-side terminal voltage is the generator-side phase voltage, the upper limit of the generator-side terminal voltage can be calculated by equation (4):

$$U_{ref\_max\_limit} = \frac{U_{dc\_meas}}{\sqrt{3}} - U_{dead\_time} - VCE_{sat} \quad (4)$$

In step S20, an optimal value of the generator-side terminal voltage that is able to minimize a generator-side current at present is determined. In other words, under the current operating state of the generator, if the target value of the generator-side terminal voltage is set to the optimal value of the generator-side terminal voltage, the generator-side current can be minimized; and the optimal value of the generator-side terminal voltage can be dynamically changed with the change of the operating state of the generator.

Here, the generator-side current is an output current of the generator.

The present application considers that, for example, for a permanent-magnet direct-drive generator, as the operating parameter such as the operating environment temperature changes, the operating voltage and current curves will change differently. For example, the current values under the same terminal voltage of the generator will be different. If a constant target value of the terminal voltage of the generator is used, it cannot adapt to the change of the operating state, and the goal of minimizing the current of the generator cannot be achieved, thereby reducing the efficiency of the system. Therefore, the present application takes the minimized generator-side current as the goal, and searches for the optimal value of the terminal voltage of the generator, so as to improve the efficiency of the electrical transmission chain of the generator. Therefore, the calorific value of the generator and the converter during operation can be reduced, the working load of the cooling devices of the generator and the converter can be reduced, and the working life of the cooling devices can be increased.

As an example, it can be determined whether the present generator-side terminal voltage falls into a preset optimal search interval $[U_{min}, U_{max}]$. If it is determined that the present generator-side terminal voltage falls into the optimal search interval, the target value of the generator-side terminal voltage may be set to different values in the optimal search interval in sequence, so as to search for the optimal value of the generator-side terminal voltage that is able to minimize the generator-side current at present. Specifically, based on the generator-side current corresponding to the target value of the generator-side terminal voltage being set to different values in the optimal search interval in sequence, a value can be searched out from the optimal search interval. If the target value of the generator-side terminal voltage is set to this value, the generator-side current can be minimized when compared with setting the target value to other values in the optimal search interval.

Here, $U_{min}$ and $U_{max}$ can be determined according to the parameters of the generator. When the generator-side terminal voltage falls into the optimal search interval, the generator-side terminal voltage is in a controllable state (that is, the generator-side terminal voltage can be effectively controlled).

It should be understood that when the present generator-side terminal voltage does not fall into the optimal search interval, the method for controlling the generator-side terminal voltage of the converter according to the exemplary embodiments of the present application may be stopped, and the method may be executed again until the next execution cycle comes.

As an example, an appropriate search method may be used to search in the optimal search interval for the optimal value of the generator-side terminal voltage that is able to minimize the generator-side current at present. For example, a hill climbing method, a genetic search method, ant a colony search method may be used. An exemplary embodiment of a method for searching in the optimal search interval for the optimal value of the generator-side terminal voltage that is able to minimize the generator-side current at present using the hill climbing method will be described below with reference to FIG. 3.

As another example, the target value of the generator-side terminal voltage corresponding to a present value of the generator-side current may be searched from a pre-established generator-side terminal voltage data table for the generator, and the searched target value may be used as the optimal value of the generator-side terminal voltage that is able to minimize the generator-side current at present, wherein the generator-side terminal voltage data table includes target values of the generator-side terminal voltage that are able to minimize the generator-side current under different values of the generator-side current respectively. Further, as an example, the target value of the generator-side terminal voltage corresponding to present operating parameter values (for example, an operating ambient temperature value, and a torque value and a rotational speed value of the generator) and the present value of the generator-side current may be searched from the pre-established generator-side terminal voltage data table, and the searched target value may be used as the optimal value of the generator-side terminal voltage that is able to minimize the generator-side current at present. Correspondingly, the generator-side terminal voltage data table may include target values of the generator-side terminal voltage that are able to minimize the generator-side current under different values of the generator-side current respectively and under different values of the operating ambient temperature respectively.

As another example, the target value of the generator-side terminal voltage corresponding to a present output power value of the generator may be searched from a pre-established generator-side terminal voltage data table for the generator, and the searched target value may be used as the optimal value of the generator-side terminal voltage that is able to minimize the generator-side current at present, wherein the generator-side terminal voltage data table includes target values of the generator-side terminal voltage that are able to minimize the generator-side current under different values of the output power value of the generator respectively.

As an example, the generator-side terminal voltage data table may be obtained through simulation or actual operation for the model of the generator.

In step S30, the target value of the generator-side terminal voltage may be set based on the upper limit of the generator-side terminal voltage and the optimal value of the generator-side terminal voltage.

As an example, when the optimal value of the generator-side terminal voltage exceeds the upper limit of the generator-side terminal voltage, the target value of the generator-side terminal voltage may be set to be the upper limit of the generator-side terminal voltage. When the optimal value of the generator-side terminal voltage does not exceed the upper limit of the generator-side terminal voltage, the target value of the generator-side terminal voltage may be set to be the optimal value of the generator-side terminal voltage.

It should be understood that the method for controlling the generator-side terminal voltage of the converter according to the exemplary embodiments of the present application may be performed periodically to achieve dynamic setting of the target value of the generator-side terminal voltage.

FIG. 3 illustrates a flowchart of a method for determining an optimal value of a generator-side terminal voltage using a hill climbing method according to an exemplary embodiment of the present application.

As shown in FIG. 3, in step S201, the target value of the generator-side terminal voltage may be set to a corresponding initial value, and a value I0 of the generator-side current and a given torque value T0 of the generator may be obtained after the generator-side terminal voltage is stable.

Here, the given torque value is a reference torque value.

As an example, when the method for controlling the generator-side terminal voltage of the converter according to the exemplary embodiments of the present application is executed for the first time, the initial value may be the minimum value $U_{min}$ in the optimal search interval. When the method for controlling the generator-side terminal voltage of the converter according to the exemplary embodiments of the present application is not executed for the first time, the initial value may be the optimal value of the generator-side terminal voltage that is able to minimize the generator-side current and is obtained by using the hill climbing method last time.

In step S202, the target value of the generator-side terminal voltage may be set as a sum of the initial value and ΔU. When the generator-side terminal voltage is stable and the given torque value is T0, it is determined whether a value I1 of the generator-side current is less than I0. If I1 is greater than I0, step S203 is performed. When I1 is less than I0, step S207 is performed. In other words, if increasing the target value of the generator-side terminal voltage on the basis of the initial value can reduce the value of the generator-side current, the target value of the generator-side terminal voltage may be increased continually. If increasing the target value of the generator-side terminal voltage cannot reduce the value of the generator-side current, the target value of the generator-side terminal voltage may be reduced on the basis of the initial value.

Here, $\Delta U$ is greater than 0.

It should be understood that after the target value of the generator-side terminal voltage is set to the sum of the initial value and $\Delta U$, I1 is the value of the generator-side current when the generator-side terminal voltage is stable and the given torque value is T0.

In step S203, the target value of the generator-side terminal voltage may be set as a difference between the initial value and $\Delta U$. When the generator-side terminal voltage is stable and the given torque value is T0, it is determined whether a value I2 of the generator-side current is less than I0. When I2 is greater than I0, step S204 is performed, that is, the initial value is determined as the optimal value of the generator-side terminal voltage that is able to minimize the generator-side current at present. When I2 is less than I0, step S205 is performed.

In step S205, the target value of the generator-side terminal voltage may be reduced by $\Delta U$. When the generator-side terminal voltage is stable and the given torque value is T0, it is determined whether a present value of the generator-side current is smaller than a previous value of the generator-side current. If the present value of the generator-side current is not smaller than the previous value of the generator-side current, step S206 is performed, that is, the target value of the generator-side terminal voltage is determined as the optimal value of the generator-side terminal voltage. If the present value of the generator-side current is smaller than the previous value of the generator-side current, step S205 is repeated.

For example, when step S205 is performed for the first time after step S203, initially the target value of the generator-side terminal voltage at step 205 is equal to (the initial value $-\Delta U$) as obtained from step S203. Then, the target value of the generator-side terminal voltage after reducing by $\Delta U$ is equal to (the initial value $-2\Delta U$). When the generator-side terminal voltage is stable and the given torque value is T0, it is determined whether the present value of the generator-side current is smaller than the previous value of the generator-side current (i.e., I2). It should be understood that when step S205 is performed again, it is proceeded to a next setting of the target value, and step S205 may reduce the target value of the generator-side terminal voltage by a step size of $\Delta U$.

In step S207, the target value of the generator-side terminal voltage may be increased by $\Delta U$. When the generator-side terminal voltage is stable and the given torque value is T0, it is determined whether a present value of the generator-side current is smaller than a previous value of the generator-side current. If the current value of the generator-side current is not smaller than the previous value of the generator-side current, step S208 is performed, that is, the target value of the generator-side terminal voltage is determined as the optimal value of the generator-side terminal voltage. If the present value of the generator-side current is smaller than the previous value of the generator-side current, step S207 is repeated;

It should be understood that the search range of the entire search process is limited to the optimal search interval.

As an example, the search equation of the above search process can be expressed by equation (5):

$$U_{set1} = U_{set0} + \Delta U \text{ if } T_1 = \qquad (5)$$
$$T_0 \begin{cases} \text{if } I_0 > I_1 \text{ do } U_{set2} = U_{set1} + \Delta U \text{ until } I_N \text{ is the minimum} \\ \text{if } I_0 < I_1 \text{ do } U_{set2} = U_{set0} - \Delta U \text{ until } I_N \text{ is the minimum} \end{cases}$$

$U_{set1}$ is the present target value of the generator-side terminal voltage, $U_{set0}$ is the last target value of the generator-side terminal voltage, $T_1$ is the present given torque value, $T_0$ is the last given torque value, $I_1$ is the present value of the generator-side current, $I_0$ is the last value of the generator-side current, $U_{set2}$ is the next target value of the generator-side terminal voltage, and $I_N$ is the minimum value of the generator-side current.

Figure 4:
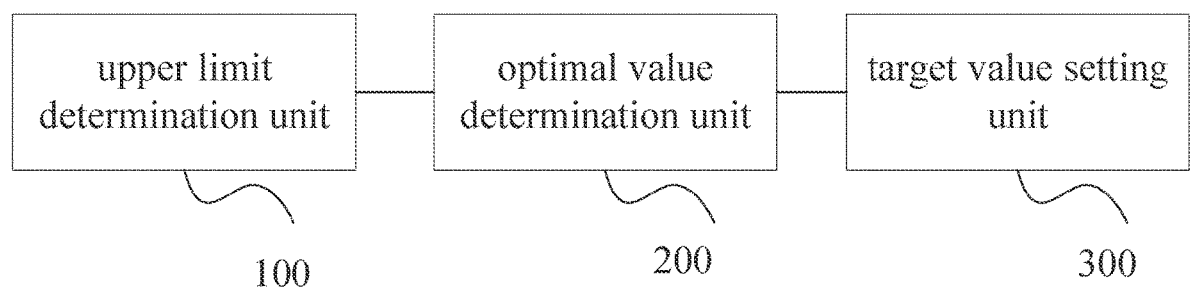
FIG. 4 illustrates a structural block diagram of a controller of a converter according to an exemplary embodiment of the present application.

FIG. 4 illustrates a structural block diagram of a controller of a converter according to an exemplary embodiment of the present application.

As shown in FIG. 4, the controller of the converter according to the exemplary embodiment of the present application includes an upper limit determination unit 100, an optimum value determination unit 200, and a target value setting unit 300.

Specifically, the upper limit determination unit 100 may be configured to determine an upper limit of the generator-side terminal voltage based on a present voltage value of a direct-current (DC) bus of the converter, wherein the generator-side terminal voltage is a voltage of an output terminal of a generator, and the output terminal is connected to the converter.

As an example, the upper limit determination unit 100 may be configured to determine, on the basis of the present voltage value of the DC bus of the converter, the upper limit of the generator-side terminal voltage further based on at least one of a preset maximum availability of a voltage of the DC bus, a voltage loss corresponding to a dead time of an IGBT module in a generator-side rectifier unit of the converter, and an on-state voltage drop of the IGBT module in the generator-side rectifier unit of the converter.

The optimal value determination unit 200 may be configured to determine an optimal value of the generator-side terminal voltage that is able to minimize a generator-side current at present, wherein the generator-side current is an output current of the generator.

As an example, the optimal value determination unit 200 may be configured to determine whether a present generator-side terminal voltage falls into a preset optimal search interval. When it is determined that the present generator-side terminal voltage falls into the optimal search interval, the optimal value determination unit 200 may set the target value of the generator-side terminal voltage to different values in the optimal search interval in sequence, so as to search in the optimal search interval for the optimal value of the generator-side terminal voltage that is able to minimize the generator-side current at present. When the generator-side terminal voltage falls into the optimal search interval, the generator-side terminal voltage is in a controllable state.

As an example, the optimal value determination unit 200 may be configured to perform the followings operations (a)-(e). Operation (a) includes: setting the target value of the generator-side terminal voltage to a corresponding initial value, and obtaining a value I0 of the generator-side current and a given torque value T0 of the generator after the generator-side terminal voltage is stable. Operation (b) includes: setting the target value of the generator-side terminal voltage as a sum of the initial value and $\Delta U$, and when the generator-side terminal voltage is stable and the given torque value is T0, determining whether a value I1 of the generator-side current is less than I0. If I1 is greater than I0, operation (c) is performed. If I1 is less than I0, operation (e) is performed. Operation (c) includes: setting the target value of the generator-side terminal voltage as a difference between the initial value and ΔU, and when the generator-side terminal voltage is stable and the given torque value is T0, determining whether a value I2 of the generator-side current is less than I0. If I2 is greater than I0, the initial value is determined as the optimal value of the generator-side terminal voltage that is able to minimize the generator-side current at present. If I2 is less than I0, operation (d) is performed. Operation (d) includes: reducing the target value of the generator-side terminal voltage by ΔU, and when the generator-side terminal voltage is stable and the given torque value is T0, determining whether a present value of the generator-side current is smaller than a previous value of the generator-side current. If the present value of the generator-side current is greater than the previous value of the generator-side current, the target value of the generator-side terminal voltage before the reduction of ΔU is determined as the optimal value of the generator-side terminal voltage that is able to minimize the generator-side current at present. If the present value of the generator-side current is smaller than the previous value of the generator-side current, operation (d) is repeated. Operation (e) includes: increasing the target value of the generator-side terminal voltage by ΔU, and when the generator-side terminal voltage is stable and the given torque value is T0, determining whether a present value of the generator-side current is smaller than a previous value of the generator-side current. If the present value of the generator-side current is greater than the previous value of the generator-side current, the target value of the generator-side terminal voltage before the increasement of ΔU is determined as the optimal value of the generator-side terminal voltage that is able to minimize the generator-side current at present. If the present value of the generator-side current is smaller than the previous value of the generator-side current, operation (e) is repeated. ΔU is greater than 0.

As another example, the optimal value determination unit 200 may be configured to search, from a pre-established generator-side terminal voltage data table for the generator, a target value of the generator-side terminal voltage corresponding to a present value of the generator-side current or an output power value of the generator, and use the searched target value as the optimal value of the generator-side terminal voltage that is able to minimize the generator-side current at present. The generator-side terminal voltage data table includes target values of the generator-side terminal voltage that are able to minimize the generator-side current under different values of the generator-side current respectively, or includes target values of the generator-side terminal voltage that are able to minimize the generator-side current under different values of the output power of the generator respectively.

The target value setting unit 300 may be configured to set the target value of the generator-side terminal voltage based on the upper limit of the generator-side terminal voltage and the optimal value of the generator-side terminal voltage.

As an example, when the optimal value of the generator-side terminal voltage exceeds the upper limit of the generator-side terminal voltage, the target value setting unit 300 may be configured to set the target value of the generator-side terminal voltage as the upper limit of the generator-side terminal voltage. When the optimal value of the generator-side terminal voltage does not exceed the upper limit of the generator-side terminal voltage, the target value setting unit 300 may be configured to set the target value of the generator-side terminal voltage as the optimal value of the generator-side terminal voltage.

It should be understood that the specific processing performed by the controller of the converter according to the exemplary embodiments of the present application has been described in detail with reference to FIG. 2 to FIG. 3, and the relevant details will not be repeated here.

It should be understood that each unit in the controller of the converter according to the exemplary embodiments of the present application may be implemented as a hardware component and/or a software component. Those skilled in the art can implement each unit by using, for example, a Field Programmable Gate Array (FPGA) or an Application Specific Integrated Circuit (ASIC) according to the defined processing performed by each unit.

The exemplary embodiments of the present application provide a computer-readable storage medium having computer programs stored thereon, wherein the computer programs, when executed by a processor, implement the method for controlling the generator-side terminal voltage of the converter described in the above exemplary embodiments. The computer-readable storage medium is any data storage device that can store data being readable by a computer system. Examples of the computer-readable storage media may include a read-only memory, a random-access memory, an optical disk, a magnetic tape, a floppy disk, an optical data storage device, and a carrier wave (such as data transmission over the Internet via wired or wireless transmission paths).

A controller of a converter according to an exemplary embodiment of the present application may include a processor (not shown) and a memory (not shown), wherein the memory has computer programs stored thereon, and the computer programs, when executed by the processor, implement the method for controlling the generator-side terminal voltage of the converter as described in the above exemplary embodiments.

While a few exemplary embodiments of the present application have been shown and described, those skilled in the art will appreciate that modifications can be made to these embodiments without departing from the principle and spirit of the present application whose scope is limited by the claims and their equivalents.

The invention claimed is:

1. A method for controlling a generator-side terminal voltage of a converter, the method comprising:
   determining an upper limit of the generator-side terminal voltage based on a present voltage value of a direct-current (DC) bus of the converter, wherein the generator-side terminal voltage is a voltage of an output terminal of a generator, and the output terminal of the generator is connected to the converter;
   determining an optimal value of the generator-side terminal voltage from a preset optimal search interval, wherein the optimal value minimizes a present value of a generator-side current when compared with other values in the preset optimal search interval, wherein the generator-side current is a current of the output terminal of the generator; and
   setting a target value of the generator-side terminal voltage based on the upper limit of the generator-side terminal voltage and the optimal value of the generator-side terminal voltage, wherein the target value is used to obtain a control reference value of the generator-side terminal voltage,
   wherein determining the optimal value of the generator-side terminal voltage comprises:

determining whether a present value of the generator-side terminal voltage falls into the preset optimal search interval; and responsive to the present value of the generator-side terminal voltage falling into the preset optimal search interval, searching in the preset optimal search interval for the optimal value of the generator-side terminal voltage that minimizes the present value of the generator-side current; and wherein searching in the preset optimal search interval for the optimal value of the generator-side terminal voltage that minimizes the present value of the generator-side current comprises:

step (a): setting the target value of the generator-side terminal voltage to an initial value, and obtaining a value I0 of the generator-side current and a given torque value T0 of the generator after the generator-side terminal voltage is stable;

step (b): updating the target value of the generator-side terminal voltage as a sum of the initial value and $\Delta U$, and when the generator-side terminal voltage is stable and the given torque value is T0, determining whether a value I1 of the generator-side current is less than I0, wherein when I1 is greater than I0, step (c) is performed, or, when I1 is less than I0, step (e) is performed;

step (c): updating the target value of the generator-side terminal voltage as a difference between the initial value and $\Delta U$, and when the generator-side terminal voltage is stable and the given torque value is T0, determining whether a value I2 of the generator-side current is less than I0, wherein when I2 is greater than I0, the initial value is determined as the optimal value of the generator-side terminal voltage that minimizes the present value of the generator-side current, or, when I2 is less than I0, step (d) is performed;

step (d): reducing the target value of the generator-side terminal voltage by $\Delta U$, and when the generator-side terminal voltage is stable and the given torque value is T0, determining whether the present value of the generator-side current is smaller than a previous value of the generator-side current, wherein when the present value of the generator-side current is not smaller than the previous value of the generator-side current, the target value of the generator-side terminal voltage is determined as the optimal value of the generator-side terminal voltage, or, when the present value of the generator-side current is smaller than the previous value of the generator-side current, step (d) is repeated; and step (e): increasing the target value of the generator-side terminal voltage by $\Delta U$, and when the generator-side terminal voltage is stable and the given torque value is T0, determining whether the present value of the generator-side current is smaller than the previous value of the generator-side current, wherein when the present value of the generator-side current is not smaller than the previous value of the generator-side current, the target value of the generator-side terminal voltage is determined as the optimal value of the generator-side terminal voltage or, when the present value of the generator-side current is smaller than the previous value of the generator-side current, step (e) is repeated, wherein $\Delta U$ is greater than 0.

2. The method according to claim 1, wherein setting the target value of the generator-side terminal voltage comprises:

when the optimal value of the generator-side terminal voltage exceeds the upper limit of the generator-side terminal voltage, setting the target value of the generator-side terminal voltage to be equal to the upper limit of the generator-side terminal voltage; or when the optimal value of the generator-side terminal voltage does not exceed the upper limit of the generator-side terminal voltage, setting the target value of the generator-side terminal voltage to be equal to the optimal value of the generator-side terminal voltage.

3. The method according to claim 1, wherein determining the upper limit of the generator-side terminal voltage further comprises:

determining the upper limit of the generator-side terminal voltage further based on at least one of a preset maximum availability of a voltage of the DC bus, a voltage loss corresponding to a dead time of an Insulate-Gate Bipolar Transistor (IGBT) module in a generator-side rectifier unit of the converter, or an on-state voltage drop of the IGBT module in the generator-side rectifier unit of the converter.

4. A controller of a converter, comprising:

a processor; and a memory having computer programs stored thereon, wherein the computer programs, when executed by the processor, implement a method for controlling a generator-side terminal voltage of the converter, the method comprising:

determining an upper limit of the generator-side terminal voltage based on a present voltage value of a direct-current (DC) bus of the converter, wherein the generator-side terminal voltage is a voltage of an output terminal of a generator, and the output terminal of the generator is connected to the converter;

determining an optimal value of the generator-side terminal voltage from a preset optimal search interval, wherein the optimal value minimizes a present value of a generator-side current when compared with other values in the preset optimal search interval, wherein the generator-side current is a current of the output terminal of the generator; and setting a target value of the generator-side terminal voltage based on the upper limit of the generator-side terminal voltage and the optimal value of the generator-side terminal voltage, wherein the target value is used to obtain a control reference value of the generator-side terminal voltage, wherein determining the optimal value of the generator-side terminal voltage comprises:

determining whether a present value of the generator-side terminal voltage falls into the preset optimal search interval; and responsive to the present value of the generator-side terminal voltage falling into the preset optimal search interval, searching in the preset optimal search interval for the optimal value of the generator-side terminal voltage that minimizes the present value of the generator-side current; and wherein searching in the preset optimal search interval for the optimal value of the generator-side terminal voltage that minimizes the present value of the generator-side current comprises:

step (a): setting the target value of the generator-side terminal voltage to an initial value, and obtaining a value I0 of the generator-side current and a given torque value T0 of the generator after the generator-side terminal voltage is stable;

step (b): updating the target value of the generator-side terminal voltage as a sum of the initial value and ΔU, and when the generator-side terminal voltage is stable and the given torque value is T0, determining whether a value I1 of the generator-side current is less than I0, wherein when I1 is greater than I0, step (c) is performed, or, when I1 is less than I0, step (e) is performed;

step (c): updating the target value of the generator-side terminal voltage as a difference between the initial value and ΔU, and when the generator-side terminal voltage is stable and the given torque value is T0, determining whether a value I2 of the generator-side current is less than I0, wherein when I2 is greater than I0, the initial value is determined as the optimal value of the generator-side terminal voltage that minimizes the present value of the generator-side current, or, when I2 is less than I0, step (d) is performed;

step (d): reducing the target value of the generator-side terminal voltage by ΔU, and when the generator-side terminal voltage is stable and the given torque value is T0, determining whether the present value of the generator-side current is smaller than a previous value of the generator-side current, wherein when the present value of the generator-side current is not smaller than the previous value of the generator-side current, the target value of the generator-side terminal voltage is determined as the optimal value of the generator-side terminal voltage, or, when the present value of the generator-side current is smaller than the previous value of the generator-side current, step (d) is repeated; and step (e): increasing the target value of the generator-side terminal voltage by ΔU, and when the generator-side terminal voltage is stable and the given torque value is T0, determining whether the present value of the generator-side current is smaller than the previous value of the generator-side current, wherein when the present value of the generator-side current is not smaller than the previous value of the generator-side current, the target value of the generator-side terminal voltage is determined as the optimal value of the generator-side terminal voltage or, when the present value of the generator-side current is smaller than the previous value of the generator-side current, step (e) is repeated, wherein ΔU is greater than 0.

5. The controller according to claim 4, wherein setting the target value of the generator-side terminal voltage comprises:

when the optimal value of the generator-side terminal voltage exceeds the upper limit of the generator-side terminal voltage, setting the target value of the generator-side terminal voltage to be equal to the upper limit of the generator-side terminal voltage.

6. The controller according to claim 4, wherein setting the target value of the generator-side terminal voltage comprises:

when the optimal value of the generator-side terminal voltage does not exceed the upper limit of the generator-side terminal voltage, setting the target value of the generator-side terminal voltage to be equal to the optimal value of the generator-side terminal voltage.

7. The controller according to claim 4, wherein determining the upper limit of the generator-side terminal voltage further comprises:

determining the upper limit of the generator-side terminal voltage further based on at least one of a preset maximum availability of a voltage of the DC bus, a voltage loss corresponding to a dead time of an Insulate-Gate Bipolar Transistor (IGBT) module in a generator-side rectifier unit of the converter, or an on-state voltage drop of the IGBT module in the generator-side rectifier unit of the converter.

8. A computer-readable storage medium having computer programs stored thereon, wherein the computer programs, when executed by a processor, implement a method for controlling a generator-side terminal voltage of a converter, the method comprising:

determining an upper limit of the generator-side terminal voltage based on a present voltage value of a direct-current (DC) bus of the converter, wherein the generator-side terminal voltage is a voltage of an output terminal of a generator, and the output terminal of the generator is connected to the converter;

determining an optimal value of the generator-side terminal voltage from a preset optimal search interval, wherein the optimal value minimizes a present value of a generator-side current when compared with other values in the preset optimal search interval, wherein the generator-side current is a current of the output terminal of the generator; and setting a target value of the generator-side terminal voltage based on the upper limit of the generator-side terminal voltage and the optimal value of the generator-side terminal voltage, wherein the target value is used to obtain a control reference value of the generator-side terminal voltage, wherein determining the optimal value of the generator-side terminal voltage comprises:

determining whether a present value of the generator-side terminal voltage falls into the preset optimal search interval; and responsive to the present value of the generator-side terminal voltage falling into the preset optimal search interval, searching in the preset optimal search interval for the optimal value of the generator-side terminal voltage that minimizes the present value of the generator-side current; and wherein searching in the preset optimal search interval for the optimal value of the generator-side terminal voltage that minimizes the present value of the generator-side current comprises:

step (a): setting the target value of the generator-side terminal voltage to an initial value, and obtaining a value I0 of the generator-side current and a given torque value T0 of the generator after the generator-side terminal voltage is stable;

step (b): updating the target value of the generator-side terminal voltage as a sum of the initial value and ΔU, and when the generator-side terminal voltage is stable and the given torque value is T0, determining whether a value I1 of the generator-side current is less than I0, wherein when I1 is greater than I0, step (c) is performed, or, when I1 is less than I0, step (e) is performed;

step (c): updating the target value of the generator-side terminal voltage as a difference between the initial value and ΔU, and when the generator-side terminal voltage is stable and the given torque value is T0, determining whether a value I2 of the generator-side current is less than I0, wherein when I2 is greater than I0, the initial value is determined as the optimal value of the generator-side terminal voltage that minimizes the present value of the generator-side current, or, when I2 is less than I0, step (d) is performed;

step (d): reducing the target value of the generator-side terminal voltage by ΔU, and when the generator-side terminal voltage is stable and the given torque value is T0, determining whether the present value of the generator-side current is smaller than a previous value of the generator-side current, wherein when the present value of the generator-side current is not smaller than the previous value of the generator-side current, the target value of the generator-side terminal voltage is determined as the optimal value of the generator-side terminal voltage, or, when the present value of the generator-side current is smaller than the previous value of the generator-side current, step (d) is repeated; and step (e): increasing the target value of the generator-side terminal voltage by ΔU, and when the generator-side terminal voltage is stable and the given torque value is T0, determining whether the present value of the generator-side current is smaller than the previous value of the generator-side current, wherein when the present value of the generator-side current is not smaller than the previous value of the generator-side current, the target value of the generator-side terminal voltage is determined as the optimal value of the generator-side terminal voltage or, when the present value of the generator-side current is smaller than the previous value of the generator-side current, step (e) is repeated, wherein ΔU is greater than 0.

9. The computer-readable storage medium according to claim 8, wherein setting the target value of the generator-side terminal voltage comprises:

when the optimal value of the generator-side terminal voltage exceeds the upper limit of the generator-side terminal voltage, setting the target value of the generator-side terminal voltage to be equal to the upper limit of the generator-side terminal voltage.

10. The computer-readable storage medium according to claim 8, wherein setting the target value of the generator-side terminal voltage comprises:

when the optimal value of the generator-side terminal voltage does not exceed the upper limit of the generator-side terminal voltage, setting the target value of the generator-side terminal voltage to be equal to the optimal value of the generator-side terminal voltage.

11. The computer-readable storage medium according to claim 8, wherein determining the upper limit of the generator-side terminal voltage further comprises:

determining the upper limit of the generator-side terminal voltage further based on at least one of a preset maximum availability of a voltage of the DC bus, a voltage loss corresponding to a dead time of an Insulate-Gate Bipolar Transistor (IGBT) module in a generator-side rectifier unit of the converter, or an on-state voltage drop of the IGBT module in the generator-side rectifier unit of the converter.

* * * * *